United States Patent
Achrenius et al.

(10) Patent No.: US 11,631,187 B2
(45) Date of Patent: Apr. 18, 2023

(54) DEPTH BUFFER PRE-PASS

(71) Applicants: Advanced Micro Devices, Inc., Santa Clara, CA (US); ATI Technologies ULC, Markham (CA)

(72) Inventors: Jan Henrik Achrenius, Santa Clara, CA (US); Mika Tuomi, Santa Clara, CA (US); Kiia Kallio, Santa Clara, CA (US); Pazhani Pillai, Boxborough, MA (US); Laurent Lefebvre, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 17/031,645

(22) Filed: Sep. 24, 2020

(65) Prior Publication Data
US 2022/0092801 A1   Mar. 24, 2022

(51) Int. Cl.
  *G06T 15/80*  (2011.01)
  *G06T 7/50*  (2017.01)
(52) U.S. Cl.
  CPC .............. *G06T 7/50* (2017.01); *G06T 15/80* (2013.01)
(58) Field of Classification Search
  CPC ............ G06T 15/405; G06T 1/20; G06T 1/60
  See application file for complete search history.

(56) References Cited

U.S. PATENT DOCUMENTS

| 5,729,672 | A | 3/1998 | Ashton |
| 9,189,883 | B1 | 11/2015 | Hecht |
| 10,636,201 | B2 | 4/2020 | Mitchell et al. |
| 10,665,010 | B2 | 5/2020 | Hazel |
| 10,679,405 | B2 | 6/2020 | Fursund et al. |
| 10,692,270 | B2 | 6/2020 | Stanard et al. |
| 10,789,675 | B2 | 9/2020 | Pohl |
| 2013/0328895 | A1* | 12/2013 | Sellers ................ G06T 1/20 345/522 |

(Continued)

OTHER PUBLICATIONS

"General OpenGL—Per-Sample Processing—Scissor Test—Stencil Test—Depth Test—Eady Fragment Test", Apr. 22, 2019, 31 pages, https://web.archive.org/web/20200930182637/https://www.khronos.org/opengl/wiki/General_OpenGL. [Retrieved Feb. 11, 2021].

(Continued)

*Primary Examiner* — Ryan McCulley
(74) *Attorney, Agent, or Firm* — Kowert Hood Munyon Rankin and Goetzel PC; Rory D. Rankin

(57) ABSTRACT

Systems, apparatuses, and methods for implementing a depth buffer pre-pass are disclosed. A rendering application uses a binning approach to render primitives of a virtual scene on a tile-by-tile basis, with each tile corresponding to a portion of the screen. The application causes a depth buffer pre-pass to be performed for the primitives of the tile before a pixel shader is invoked. During the depth buffer pre-pass, only the depth part of the virtual scene is rendered to determine which pixel samples are visible and which pixel samples are hidden. Then, the scene is redrawn, but the pixel samples that are hidden are not sent to the pixel shader. In cases where a relatively large percentage of primitives overlap, this technique increases the efficiency of the rendering application since pixel shading can be avoided for the pixel samples that are hidden.

19 Claims, 13 Drawing Sheets

(56) References Cited

U.S. PATENT DOCUMENTS

| | | | |
|---|---|---|---|
| 2014/0354640 A1* | 12/2014 | Nystad | G06T 15/40 |
| | | | 345/421 |
| 2016/0086299 A1 | 3/2016 | Sharma et al. | |
| 2019/0243652 A9* | 8/2019 | Hakura | G06T 15/405 |
| 2019/0295313 A1 | 9/2019 | Davies et al. | |
| 2021/0065437 A1* | 3/2021 | Brkic | G06T 11/40 |
| 2021/0150797 A1 | 5/2021 | Tuomi et al. | |

OTHER PUBLICATIONS

Crow, "Shadow Algorithms for Computer Graphics", pp. 242-248, Siggraph '77, Jul. 20-22 San Jose, California.

International Search Report and Written Opinion in International Application No. PCT/US2020/060490, dated Feb. 23, 2021, 17 pages.

Klehm, Oliver, "Interactive Massive Lighting for Virtual 3D City Models", Master's Thesis, Oct. 30, 2010, 85 pages, https://people.mpi-inf.mpg.de/~oklehm/publications/2010/master/massive_lighting_klehm10.pdf. [Retrieved Feb. 29, 2016].

Kolivand, et al., "Real-Time Shadow Using a Combination of Stencil and The Z-Buffer", The International Journal of Multimedia & Its Applications, vol. 3, No. 3, Aug. 2011.

Zhu et al., "Real-Time Rendering Framework in the Virtual Home Design System", Transactions on Edutainment IX, Jan. 2013, pp. 213-224.

International Search Report and Written Opinion in International Application No. PCT/US2021/051810, dated Dec. 20, 2021, 12 pages.

\* cited by examiner

```
Let Q = subset of P (i.e., Q has selected primitives for depth prepass)

DEPTH PREPASS:
    for each primitive p in Q:
        for each sample [x, y] in p:
            if p.z[x, y] < z_buffer[x, y]:
                p_buffer[x, y] = 1
                z_buffer[x, y] = p.z[x, y]

COLOR PASS:
    for each primitive p in P:
        for each sample [x, y] in p:
            // Optionally skip sample if p in Q and p_buffer[x, y] == 0 and p.depthFunc = LESS
            if p.z[x, y] < z_buffer[x, y] or (p_buffer[x, y] == 1 and p.z[x, y] == z_buffer[x, y]):
                shade(p, x, y)
                p_buffer[x, y] = 0
                if p not in Q:
                    z_buffer[x, y] = p.z[x, y]
```

FIG. 4

DEPTH BUFFER PRE-PASS

BACKGROUND

Description of the Related Art

Graphics processors are often used within computer graphics processing systems to create computer-generated imagery from a geometric model. A geometric model defines various objects, details, lighting sources, and other elements of a virtual scene. The computing system determines how to render a given scene based on the geometric model and other inputs from a software application. These inputs include graphical objects such as points, lines, polygons, three dimensional solid objects, and other objects. These objects can be referred to more generally as "primitives".

A graphics processing unit (GPU) or other type of processor processes the inputs and the geometric model to generate a two or three dimensional array of pixel color values that represent the desired image or video frame. Each pixel of a frame has multiple attributes associated with it, including a color and a texture. Typically, a shader is used to perform arithmetic and logical operations on the attributes of each pixel to achieve a final value that represents the pixel. The final value is placed into a frame buffer and is used when the pixel is driven to a display device.

When multiple primitives are rendered and projected to the same pixels on the screen, the rendering engine needs to determine which primitive is visible and which primitives are hidden. One technique for resolving occlusion issues involves having a pixel shader perform a depth test with a depth buffer. For each pixel on the screen, a distance from the perspective of the viewpoint to the nearest object is stored in the depth buffer. When a primitive is projected to a given pixel of the screen space, a depth test is performed to determine if the rendered primitive is nearer to the screen (i.e., viewpoint) than the nearest previously rendered primitive. If the primitive is closer to the viewpoint than the previously rendered primitives, the primitive passes the test. Otherwise, if the primitive is further away from the viewpoint than any previously rendered primitive, the primitive fails the test. The viewpoint is defined by a virtual camera that represents a user's point of view or perspective.

In a first approach, an application assigns a value of 1.0 to a distance far away from the viewpoint and a value of 0.0 to a location at or very near to the viewpoint. In the first approach, when a new primitive is rendered, the primitive's depth value is compared to the current value in the depth buffer for each pixel covered by the primitive. If the primitive's depth value is less than the current value in the depth buffer for a given pixel, then the primitive passes the test and the primitive's depth value is written into the depth buffer for the given pixel. Otherwise, if a primitive's depth value is greater than the current value in the depth buffer for a given pixel, then the primitive fails the test and the depth buffer value remains the same. In a second approach, an application assigns a value of 0.0 to a distance far away from the viewpoint and a value of 1.0 to a location at or very near to the viewpoint. In the second approach, the determination of what constitutes a passing or failing result is reversed compared to the first approach. In other approaches, other values can be assigned to distances far away and in close proximity to the viewpoint, using other ranges than 0.0 to 1.0.

BRIEF DESCRIPTION OF THE DRAWINGS

The advantages of the methods and mechanisms described herein may be better understood by referring to the following description in conjunction with the accompanying drawings, in which:

FIG. 4 illustrates one example of pseudocode for performing a depth buffer pre-pass.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing a depth buffer pre-pass are disclosed herein. A processor executes an application to render a virtual scene. In one implementation, the application executing on the processor causes a depth pre-pass to be performed before a pixel shader is invoked. During the depth pre-pass, only the depth part of the virtual scene is rendered to determine which primitives are visible and which primitives are hidden. Then, the scene is redrawn, but the primitives that are hidden are not sent to the pixel shader. In cases where a relatively large percentage of primitives overlap, this technique increases the efficiency of the rendering application since pixel shading can be avoided for the primitives that are hidden.

In one implementation, the above approach is employed in conjunction with binning, where only a small region of the screen is drawn at a time. In one implementation, the system includes a batch binner, where a certain number of primitives are accumulated, and then a small part (i.e., a tile) of the screen is rendered. In one implementation, the primitives for the batch are stored in a cache to reduce access latency involved with fetching the primitives. In one implementation, the number of primitives in a batch is determined based on a size of the cache. In this implementation, the cache is sized according to the color and/or depth surfaces being rendered.

In one implementation, a given frame of a virtual scene is partitioned into tiles, and the scene is rendered on a tile-by-tile basis. Each tile (i.e., bin) includes any number of primitives, the primitives can span multiple tiles, and these primitives can be replayed multiple times. While the system is processing a tile, the depth part of each primitive in the tile is rendered first, and then the tile is processed again for the color information associated with each primitive that passed the pre-pass depth test. During the color pass, a pixel shader shades pixels to represent the virtual scene. The pixels can then be provided to a display controller to be driven to a display. This process can be repeated for each frame of a video game, movie, or other application.

Figure 1:
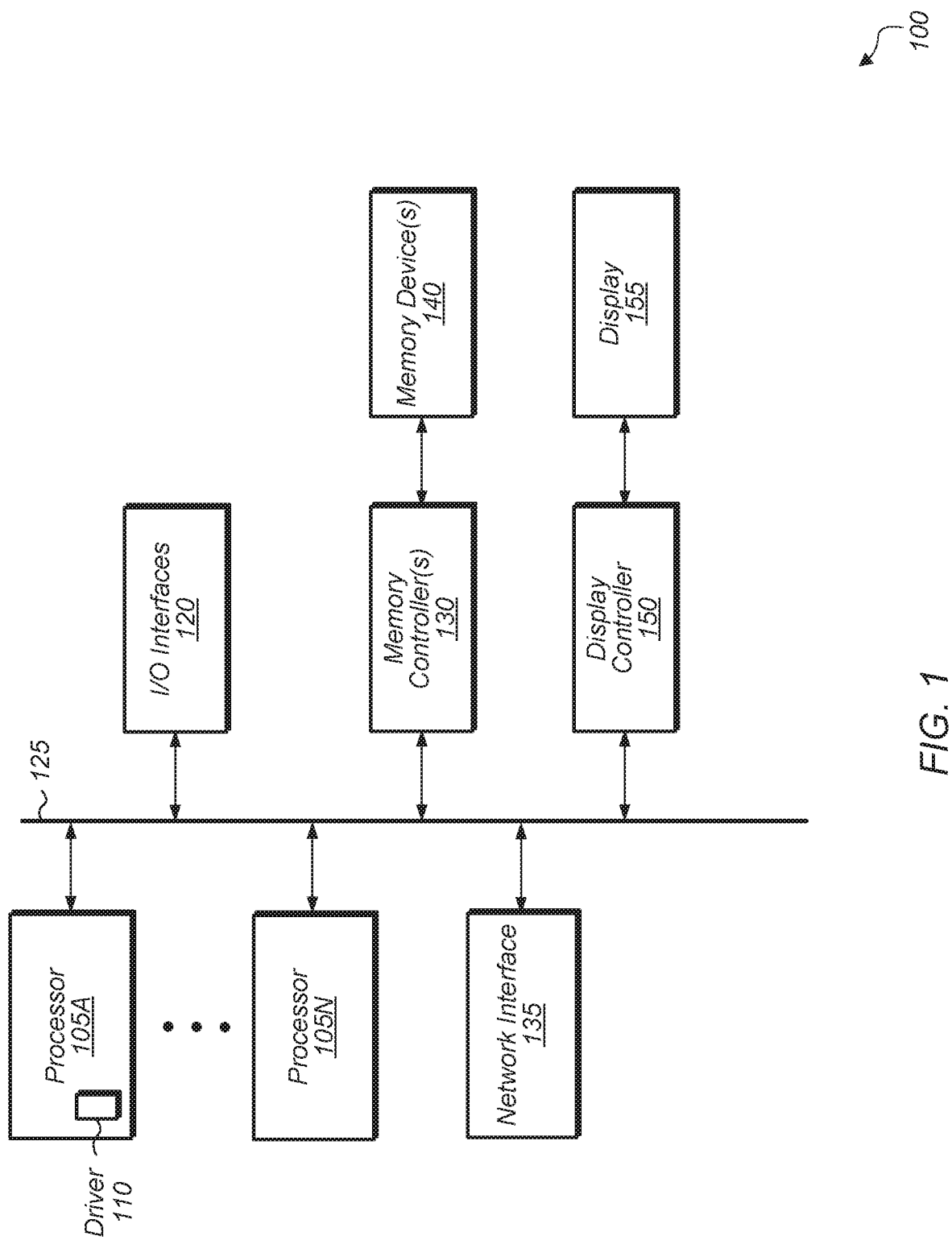
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 110 (e.g., graphics driver) for communicating with and/or controlling the operation of one or more of the other processors in system 100. It is noted that depending on the implementation, driver 110 can be implemented using any suitable combination of hardware, software, and/or firmware. In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. While memory controller(s) 130 are shown as being separate from processor 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is able to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
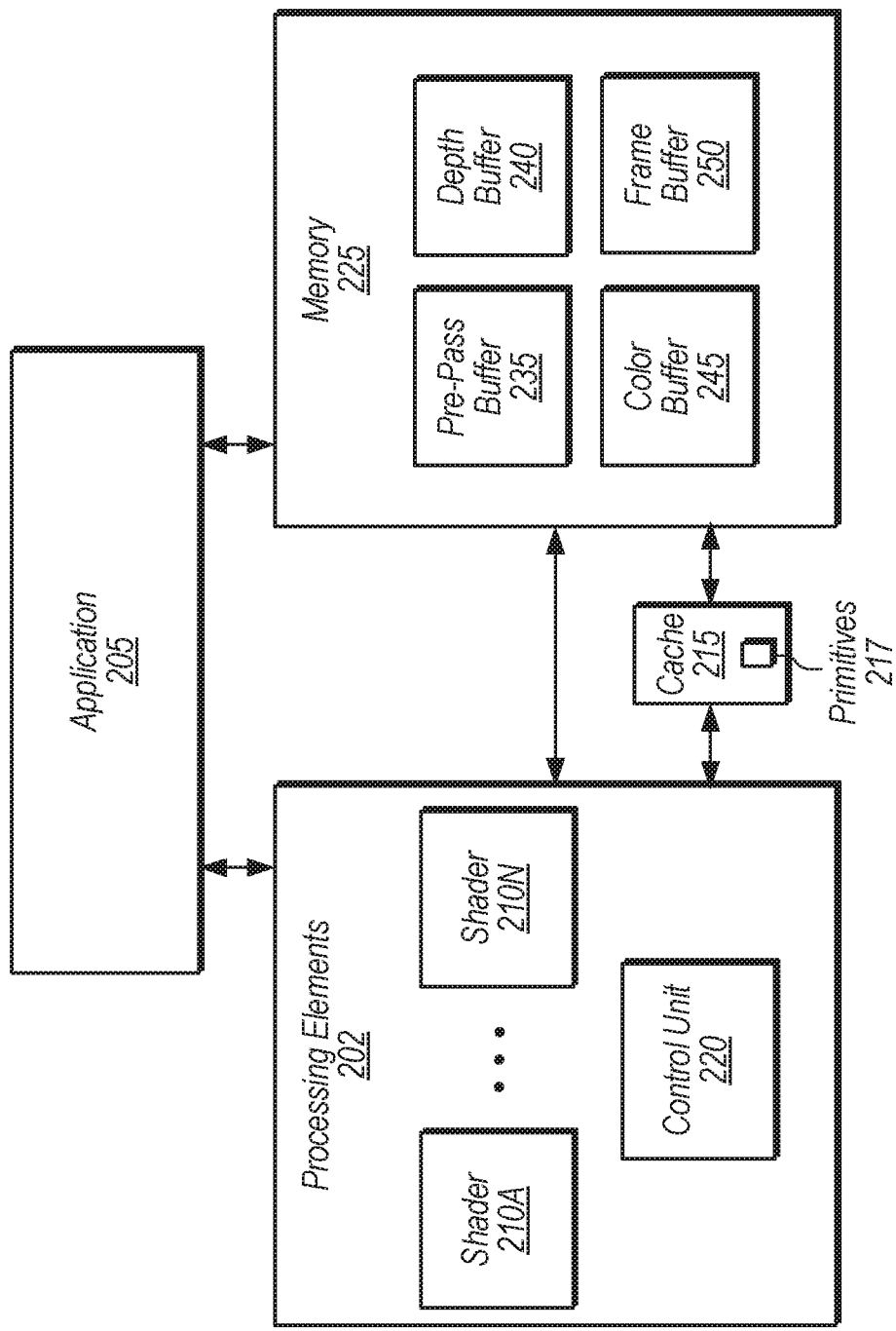
FIG. 2 is a logical block diagram of another implementation of a system for rendering graphics.

Turning now to FIG. 2, a logical block diagram of one implementation of a system 200 for rendering graphics is shown. In one implementation, system 200 includes components such as processing elements 202, application 205, and memory 225. Processing elements 202 include at least shaders 210A-N and control unit 220. Shaders 210A-N are representative of any number and type of shaders (e.g., geometry shader, light shader, pixel shader). Processing elements 202 include one or more CPUs, GPUs, FPGAs, ASICs, DSPs, and/or other processing resources. It is noted that system 200 can also include any number and type of other components, with the other components varying from implementation to implementation. In one implementation, application 205 is a graphics application for rendering pixels to represent scenes of a video game, movie, or other application. In one implementation, application 205 includes program instructions which are stored in memory 225 and which execute on processing elements 202. Application 205 can run on a general-purpose processor or on fixed hardware such as a FPGA or ASIC. Similarly, shaders 210A-N can be implemented using any suitable combination of software and/or hardware.

In various implementations, shaders 210A-N include a geometry shader which generates depth values for the scene geometry of a given scene projected onto a projection plane. During a depth buffer pre-pass, the geometry of primitives 217 are generated and a depth buffer test is performed for primitives 217 using depth buffer 240. In one implementation, primitives 217 correspond to a single tile of the screen. In this implementation, application 205 renders a frame on a tile-by-tile basis. During the depth buffer pre-pass, primitives are rasterized into pixel samples (i.e., fragments), pixel samples which are visible are identified, and corresponding indicators are stored in pre-pass buffer 235. As used herein, a "pixel sample" is defined as the data necessary to generate a portion of a primitive, where the portion projects to a single pixel of screen space. It is noted that the terms "pixel sample", "sample", and "fragment" may be used interchangeably herein.

After the depth buffer pre-pass, a color pass is performed on the visible pixel samples to render the color values of pixel samples. The color values are then stored in color buffer 245. Pixel samples which are hidden are not rendered in the color pass, which helps to reduce the amount of work performed by the pixel shader. The pixel shader generates the color and additional appearance attributes that are to be applied to each pixel of a rendered object. Eventually, shaded pixels are written to frame buffer 250 to be driven to a display (e.g., display 155 of FIG. 1).

Figure 3:
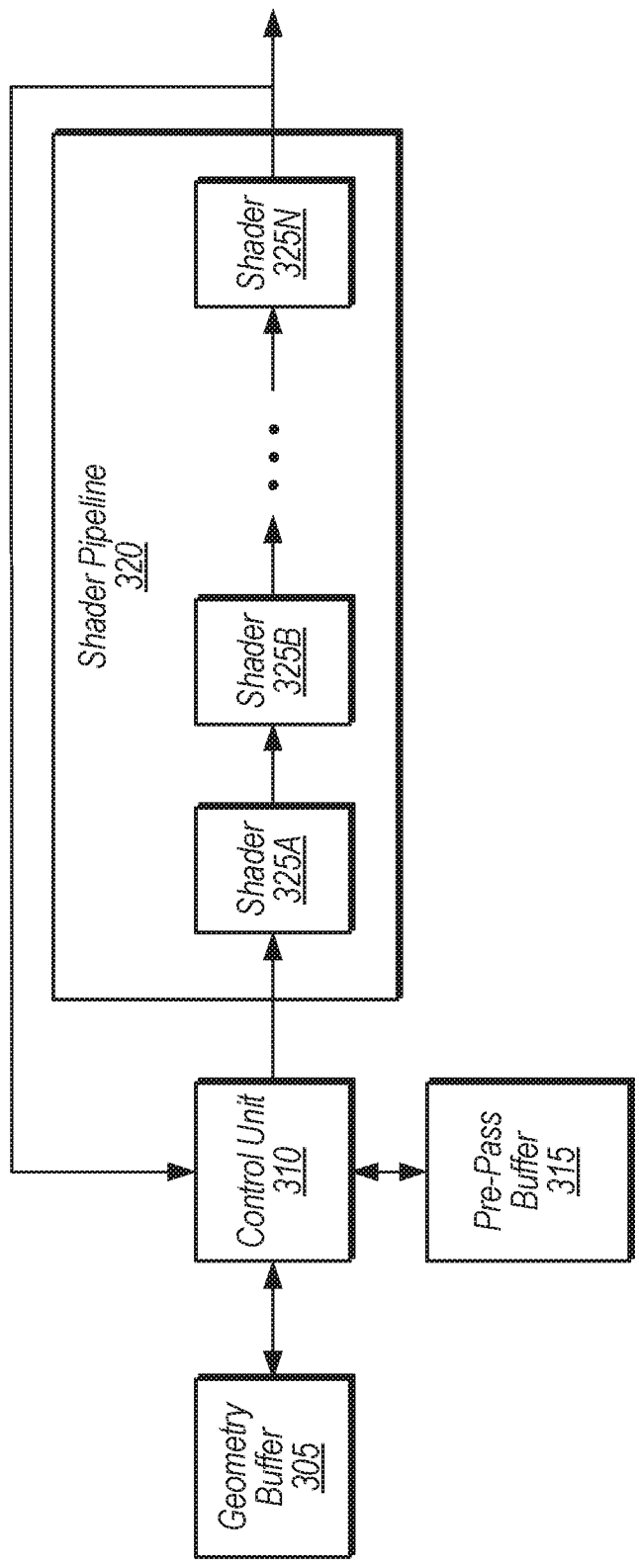
FIG. 3 is a block diagram of one implementation of a computing system.

Referring now to FIG. 3, a block diagram of one implementation of a computing system 300 is shown. In one implementation, computing system 300 includes at least geometry buffer 305, control unit 310, pre-pass buffer 315, and shader pipeline 320. Control unit 310 can be implemented using any suitable combination of software and/or hardware. It is noted that control unit 310 can also be referred to as control logic 310. Computing system 300 can include any number of other components (e.g., memory device, frame buffer, display) which are not shown to avoid obscuring the figure.

In one implementation, control unit 310 causes the pixels of geometry buffer 305 to be processed by shader pipeline 320 in a depth buffer pre-pass. The depth buffer pre-pass can be sparse (i.e., selected primitives are tested and written) or the depth buffer pre-pass can be full (i.e., all primitives are tested and written). During the depth buffer pre-pass, pixel samples that are visible are identified, and this information is recorded in pre-pass buffer 315. For example, in one implementation, each pixel sample covered by a primitive has a corresponding indicator in pre-pass buffer 315. In this implementation, if the primitive is visible at the given pixel location, then the corresponding indicator for the given pixel location is set to a first value (e.g., 1) during the depth buffer pre-pass. It is noted that primitives can be processed on a pixel sample-by-pixel sample basis, and each pixel sample can be processed individually.

After the depth buffer pre-pass, a color pass through shader pipeline 320 is launched for the primitives being rendered. If a full depth buffer pre-pass was performed, then for a given pixel sample of a primitive being processed by the color pass, if the corresponding indicator in pre-pass buffer 315 is set to a second value (e.g., 0), the color pass is skipped for the given pixel sample. This makes the color pass more efficient since a smaller number of pixel samples will be processed during the color pass. If a sparse depth buffer pre-pass was performed, and if a given primitive was not processed during the sparse depth buffer pre-pass, then all pixel samples of the given primitive will be processed during the color pass regardless of the values of the corresponding indicators in pre-pass buffer 315.

If a full depth buffer pre-pass is performed, then each visible pixel sample has a bit set in pre-pass buffer 315. After the full depth buffer pre-pass, the depth buffer contains the final depth values such that an EQUAL depth function is true for visible samples. In this case, when the depth function is LESS or GREATER, the depth function will be changed for visible samples (i.e., samples with corresponding indicators set in pre-pass buffer 315). In this case, the LESS depth function will be changed to LESS_OR_EQUAL and the GREATER depth function will be changed to GREATER_OR_EQUAL. In one implementation, a rendered pixel sample consumes the pre-pass indicator. This means that only one primitive is rendered per pixel sample when the LESS or GREATER depth function is used. However, for primitives that already have the LESS_OR_EQUAL or GREATER_OR_EQUAL depth function, there can be multiple primitives rendered at the same depth. When multiple primitives are rendered at the same depth, the last primitive that is rendered will remain visible.

If a sparse depth buffer pre-pass is performed, then the depth buffer is not in its final state at the beginning of the color pass. Any primitive that was not processed during the sparse depth buffer pre-pass cannot determine visibility based on the pre-pass buffer contents alone. Rather, a pixel sample of a primitive that was not processed during the sparse depth buffer pre-pass will not be skipped if the corresponding pre-pass buffer value is the second value (e.g., 0). Also, in one implementation, the depth buffer is updated during the color pass for the visible pixel samples of a primitive that was not processed during the sparse depth buffer pre-pass.

Shader pipeline 320 includes any number of shader units 325A-N, from 1 to N, where N is a positive integer greater than 1. It is noted that shader units 325A-N can also be referred to as shader stages 325A-N. Shader units 325A-N can include any number and type of shaders and processing stages such as a vertex shader, a light shader, a rasterizer stage, a pixel shader, a geometry shader, a fragment shader, a compute shader, and so on. In one implementation, the output of the color pass through shader pipeline 320 includes a plurality of pixels which are representative of a scene. The output of the second pass can undergo further processing, can be stored, and/or can be driven to a display.

Turning now to FIG. 4, one implementation of pseudocode 400 for performing a depth buffer pre-pass is shown. For pseudocode 400, Q is the subset of the primitives P which have been selected for the depth prepass 405. If Q includes all of the primitives P, then this means that a full depth prepass is being performed. If Q includes a subset of the primitives P, then this is a sparse depth prepass. For each primitive p in Q, each sample [x, y] is processed to determine if the depth value (i.e., z) is less than the value stored in the depth buffer (i.e., z_buffer). It is noted that the coordinates [x, y] refer to the [x, y] pixel location in the screenspace. It is assumed for the purposes of this discussion that the LESS THAN function is used for pseudocode 400. In another implementation, the GREATER THAN function can be used for the depth prepass. In this implementation, pseudocode similar to pseudocode 400 can be used, with corresponding changes to the steps to use the GREATER THAN function rather than the LESS THAN function.

If the depth value for a sample is less than the depth buffer value for a particular pixel location, this means that the sample is closer than any previously rendered samples for this pixel location, and the sample will be visible. Accordingly, if the depth value for a sample is less than the depth buffer value for the given pixel location, then the prepass indicator is set for that given pixel location. The prepass indicator is specified as "p_buffer[x, y]" in pseudocode 400. Also, the depth buffer is updated to store the depth value of the sample.

After the depth prepass 405 is finished for the primitives p in Q, then the color pass 410 is launched. A pixel sample is optionally skipped during color pass 410 if the primitive p is in Q (i.e., the primitive p was including in the depth prepass 405) and the prepass buffer value is "0" and the depth function is LESS THAN. Otherwise, for each primitive p in P, and for each sample [x, y] in p, a conditional step is performed. The first part of the conditional step determines if the depth value for the sample (i.e., p.z[x, y]) is less than the depth buffer value for the pixel location (i.e., z_buffer[x, y]). The second part of the conditional step determines if the prepass buffer indicator (i.e., p_buffer[x, y]) is set and if the depth value for the sample is equal to the depth buffer value for the pixel location. If either the first part or the second part of the conditional step is true, then the pixel is shaded (i.e., shade(p, x, y)), the prepass buffer indicator is cleared, and the depth buffer for the pixel location is updated with the sample's depth value if p is not in Q (i.e., the primitive was not included in the depth prepass). It is noted that pseudocode 400 is one example of pseudocode that can be executed in one particular implementation. In other implementations, other pseudocode examples with other steps can be executed.

It is noted that for the LESS THAN depth function, when the depth buffer pre-pass includes all of the primitives, any pixel sample that has its pre-pass buffer indicator set during the depth buffer pre-pass will be shaded exactly once during the color pass. Primitives that are not included in the depth buffer pre-pass may render these pixel samples additional times during the color pass. Similarly, when the GREATER THAN depth function is used for the depth buffer pre-pass and when the depth buffer pre-pass includes all of the primitives, any pixel sample that has its pre-pass buffer indicator set during the depth buffer pre-pass will be shaded exactly once during the color pass.

Figure 5:
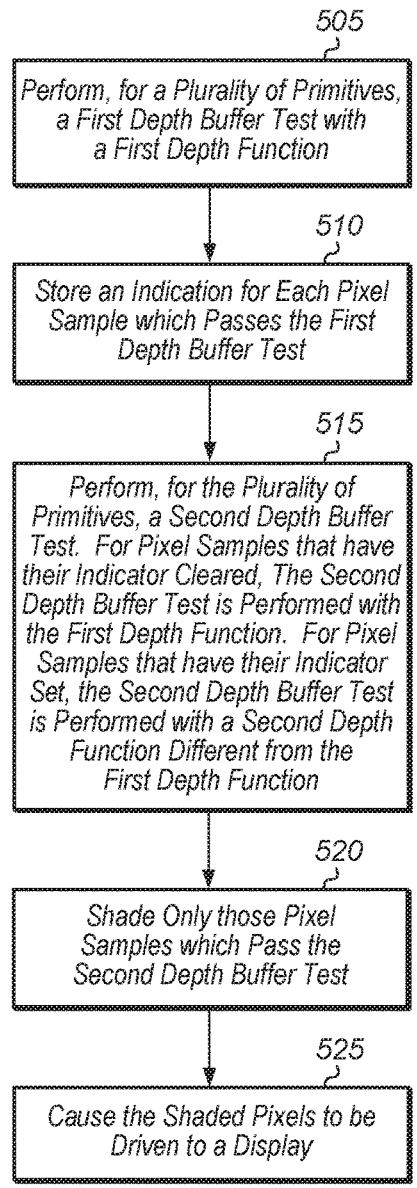
FIG. 5 is a generalized flow diagram illustrating one implementation of a method for performing a depth buffer pre-pass.

Turning now to FIG. 5, one implementation of a method 500 for performing a depth buffer pre-pass is shown. For purposes of discussion, the steps in this implementation and those of FIG. 6-13 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

A control unit performs, for a plurality of primitives, a first depth buffer test with a first depth function (block 505). In one implementation, the plurality of primitives are stored in a cache, and the plurality of primitives correspond to a given tile of the screen. In one implementation, the first depth function is a LESS THAN comparison. In another implementation, the first depth function is a GREATER THAN comparison. Next, the control unit sets an indicator for each pixel sample which passes the first depth buffer test (block 510). In other words, the control unit stores an indication for each pixel sample of a primitive which is closer to the viewpoint than any other pixel samples of other primitives projected to the same screen pixel. It is noted that the pixel samples are not shaded as a result of the first depth buffer test.

Then, the control unit performs for the plurality of primitives, a second depth buffer test (block 515). In block 515, for pixel samples that have their indicator cleared, the second depth buffer test is performed with the first depth function. For pixel samples that have their indicator set, the second depth buffer test is performed with a second depth function, where the second depth function is different from the first depth function. In one implementation, the second depth function is GREATER THAN OR EQUAL TO when the first depth function is GREATER THAN. In another implementation, the second depth function is LESS THAN OR EQUAL TO when the first depth function is LESS THAN. Next, a pixel shader shades only those pixel samples which pass the second depth buffer test. The pixel shader also clears the indicator for shaded pixels. (block 520). Then, the control unit causes the shaded pixels to be driven to a display (block 525). After block 525, method 500 ends.

Figure 6:
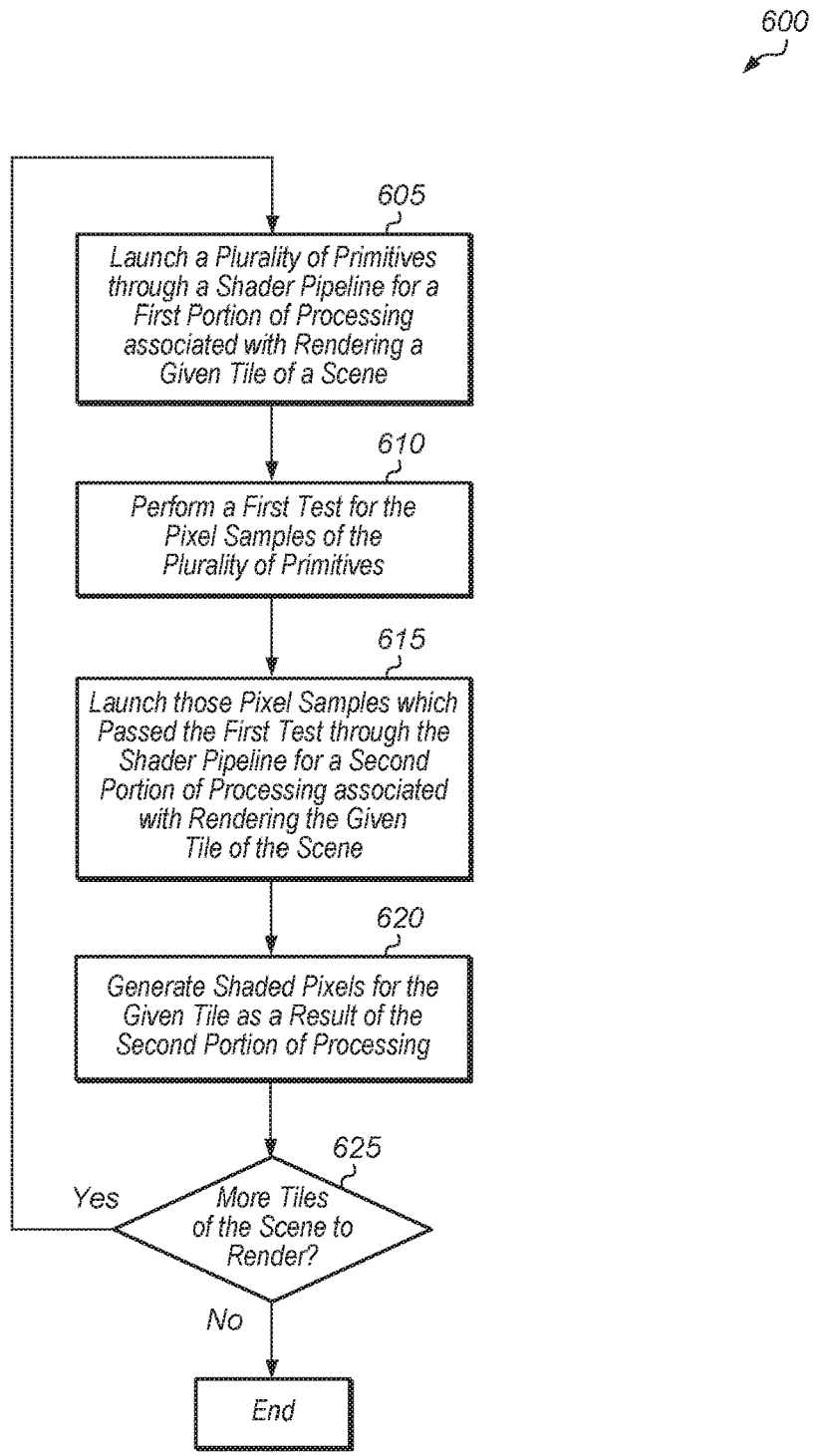
FIG. 6 is a generalized flow diagram illustrating one implementation of a method for performing separate portions of work on a tile-by-tile basis in different passes through a shader pipeline.

Referring now to FIG. 6, one implementation of a method 600 for performing separate portions of work on a tile-by-tile basis in different passes through a shader pipeline is shown. An application launches a plurality of primitives through a shader pipeline for a first portion of processing associated with rendering a given tile of a scene (block 605). In one implementation, the first portion of processing includes a depth buffer pre-pass for rendering the depth portion of the plurality of primitives. For example, in one implementation, block 605 is implemented by performing method 1000 (of FIG. 10). During the first portion of processing, a first test is performed for the pixel samples of the plurality of primitives (block 610). In one implementation, the first test is a depth buffer test. In other implementations, the first test can be other types of tests. Next, the application launches those pixel samples which passed the first test through the shader pipeline for a second portion of processing associated with rendering the given tile of the scene (block 615). In one implementation, the second portion of processing includes performing color shading of those primitives which passed the first test. For example, in one implementation, block 615 is implemented by performing method 1100 (of FIG. 11). Then, the shader pipeline generates shaded pixels for the given tile as a result of the second portion of processing (block 620). If there are more tiles of the scene to render (conditional block 625, "yes" leg), then method 600 returns to block 605. Otherwise, if all tiles of the scene have been rendered (conditional block 625, "no" leg), then method 600 ends.

Figure 7:
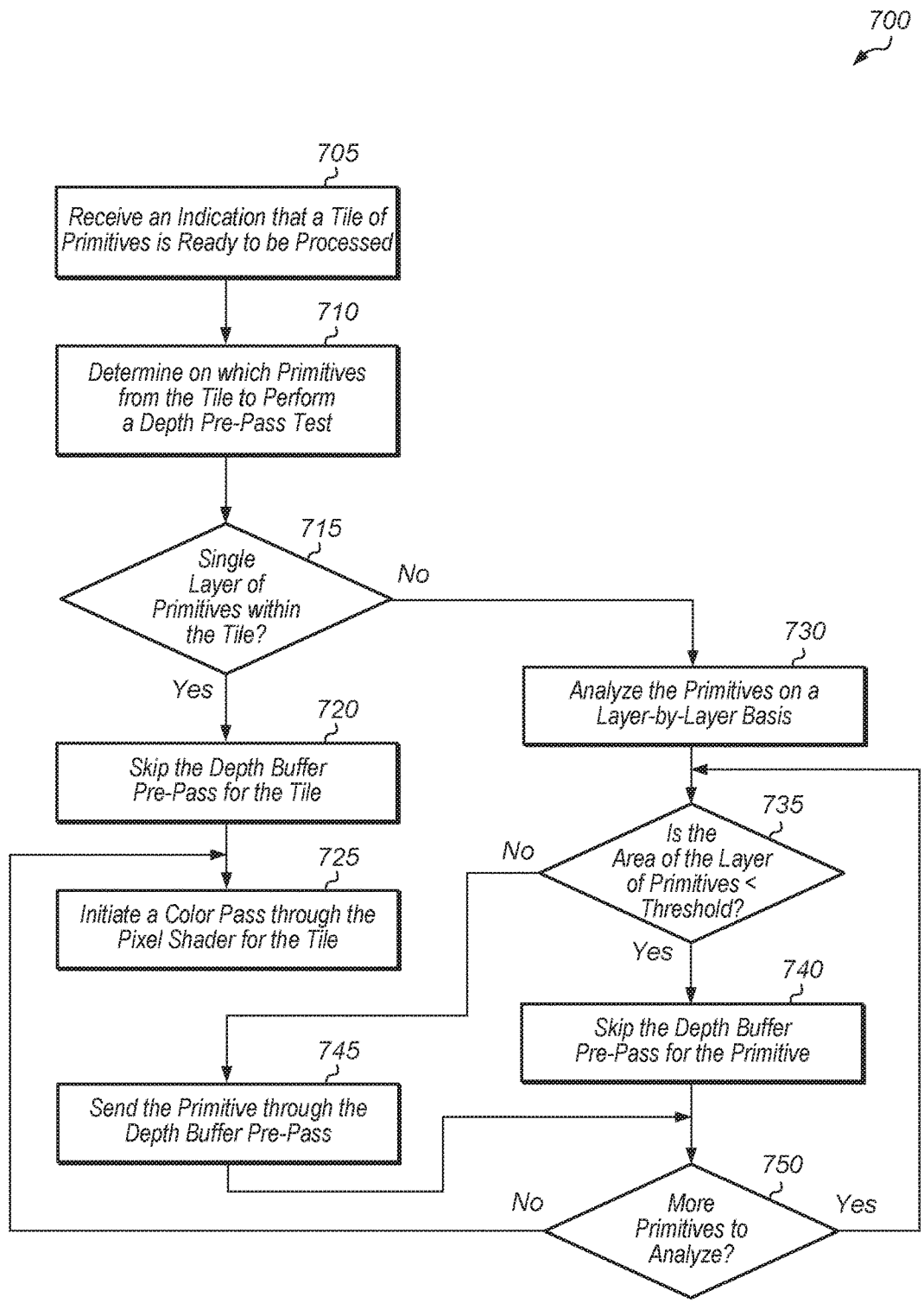
FIG. 7 is a generalized flow diagram illustrating one implementation of a method for determining which primitives to send through a depth pre-pass.

Turning now to FIG. 7, one implementation of a method 700 for determining which primitives to send through a depth buffer pre-pass is shown. A control unit receives an indication that a tile of primitives is ready to be processed (block 705). In response, the control unit determines on which primitives from the tile to perform a depth buffer pre-pass (block 710). If there is only a single layer of primitives within the tile (conditional block 715, "yes" leg), then the control unit skips the depth buffer pre-pass for the tile (block 720). After block 720, the control unit initiates a color pass through the pixel shader for the tile (block 725). After block 725, method 700 ends.

Otherwise, if there is more than one layer of primitives within the tile (conditional block 715, "no" leg), then the control unit analyzes the primitives on a layer-by-layer basis for primitives that are part of the same layer (block 730). In another implementation, the control unit analyzes the primitives on a primitive-by-primitive basis in block 730. For each primitive, if the area of the layer of primitives is less than a threshold (conditional block 735, "yes" leg), then the control unit skips the depth buffer pre-pass for the primitive (block 740). Otherwise, if the area of the layer of primitives is greater than or equal to the threshold (conditional block 735, "no" leg), then the control unit sends the primitive through the depth buffer pre-pass (block 745). After blocks 740 and 745, if there are more primitives to analyze (conditional block 750, "yes" leg), then method 700 returns to conditional block 735. Otherwise, if there are no more primitives to analyze (conditional block 750, "no" leg), then method 700 jumps to block 725. It is noted that in other implementations, other conditions can be checked to determine whether to send a primitive through the depth buffer pre-pass.

Figure 8:
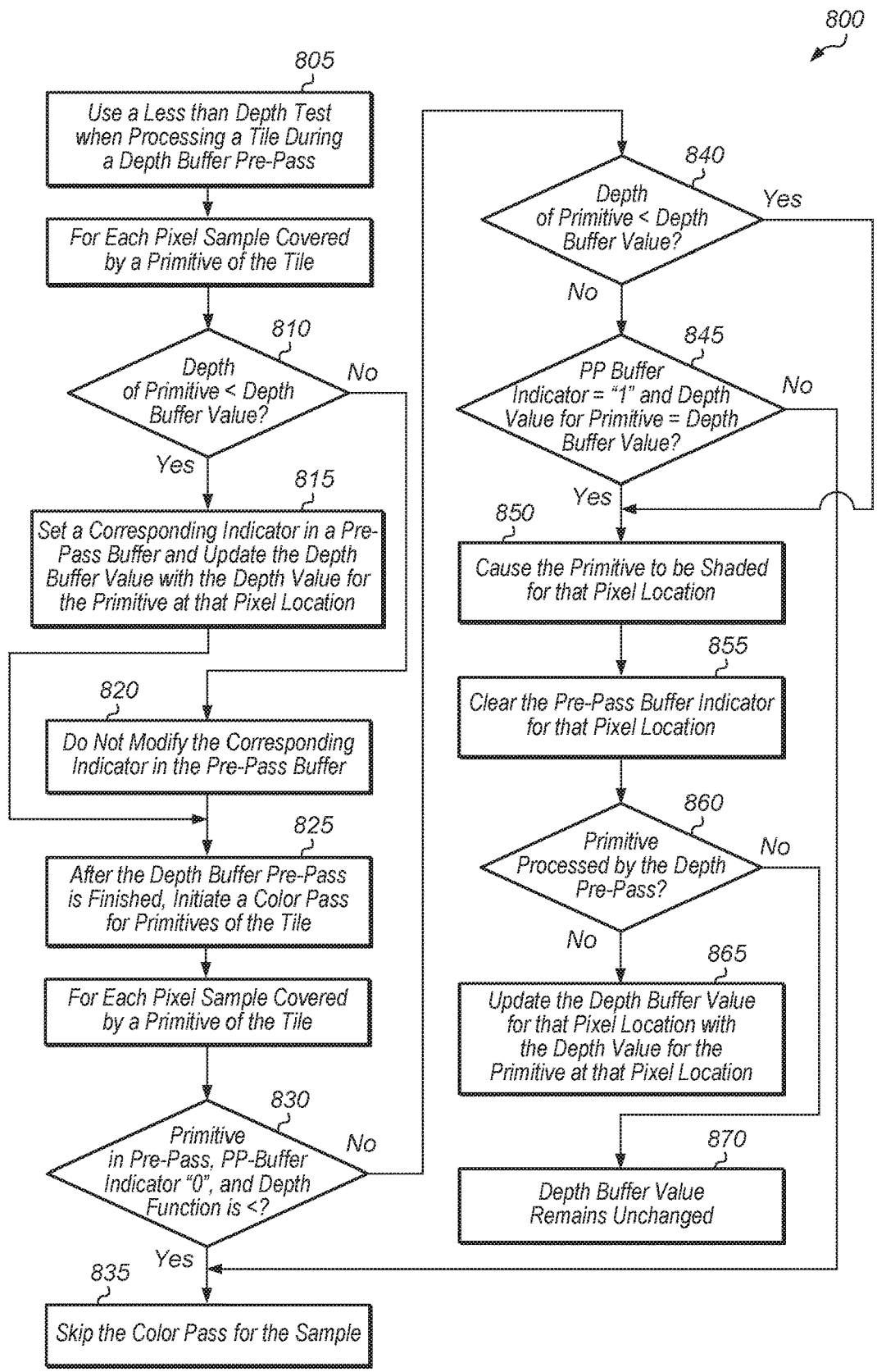
FIG. 8 is a generalized flow diagram illustrating one implementation of a method for changing a depth test function between passes.

Turning now to FIG. 8, one implementation of a method for changing a depth test function between passes is shown.

A control unit uses a LESS THAN depth test when processing a tile during a depth buffer pre-pass (block 805). For each pixel sample covered by a primitive of the tile, if the depth of the primitive at the pixel sample location is less than a depth buffer value for that pixel location (conditional block 810, "yes" leg), then the control unit sets a corresponding indicator in a pre-pass buffer and updates the depth buffer value with the depth value for the primitive at that pixel location (block 815). If the depth of the primitive at the pixel sample location is greater than or equal to the depth buffer value for that pixel location (conditional block 810, "no" leg), then the control unit does not modify the corresponding indicator in the pre-pass buffer (block 820). Then, after the depth buffer pre-pass is finished, the control unit initiates a color pass for primitives of the tile (block 825).

For each pixel sample covered by a primitive, the control unit determines if the primitive went through the depth pre-pass, if the pre-pass buffer indicator for the sample is cleared (i.e., 0), and if the depth function for the primitive is LESS THAN (conditional block 830). If the primitive went through the depth pre-pass, if the pre-pass buffer indicator for the sample is cleared, and if the depth function for the primitive is LESS THAN (conditional block 830, "yes" leg), then the control unit skips the color pass for the sample (block 835). Otherwise, if either the primitive was not processed by the depth pre-pass, if the pre-pass buffer indicator for the sample is set (i.e., 1), or if the depth function for the primitive is LESS THAN OR EQUAL TO (conditional block 830, "no" leg), then the control unit determines if the depth of the primitive at the pixel location is less than a depth buffer value for that pixel location (conditional block 840).

If the depth of the primitive at the pixel location is less than the depth buffer value for that pixel location (conditional block 840, "yes" leg), then the control unit causes the primitive to be shaded for that pixel location (block 850). Also, the pre-pass buffer indicator for that pixel location is cleared (block 855). If the primitive was not processed by the depth pre-pass (conditional block 860, "no" leg), then the depth buffer value for that pixel location is updated with the depth value for the primitive at that pixel location (block 865). Otherwise, if the primitive was processed by the depth pre-pass (conditional block 860, "yes" leg), then the depth buffer value remains unchanged (block 870).

If the depth of the primitive at the pixel location is greater than or equal to the depth buffer value for that pixel location (conditional block 840, "no" leg), then the control unit determines if the pre-pass buffer indicator for that pixel location is set and if the depth value for the primitive at that pixel location is equal to the depth buffer value for that pixel location (conditional block 845). If the pre-pass buffer indicator for that pixel location is set and if the depth value for the primitive at that pixel location is equal to the depth buffer value for that pixel location (conditional block 845, "yes" leg), then the control unit causes the primitive to be shaded for that pixel location (block 850). Otherwise, if either the pre-pass buffer indicator for that pixel location is cleared or if the depth value for the primitive at that pixel location is greater than the depth buffer value for that pixel location (conditional block 845, "no" leg), then the control unit skips the color pass for the sample (block 835).

Figure 9:
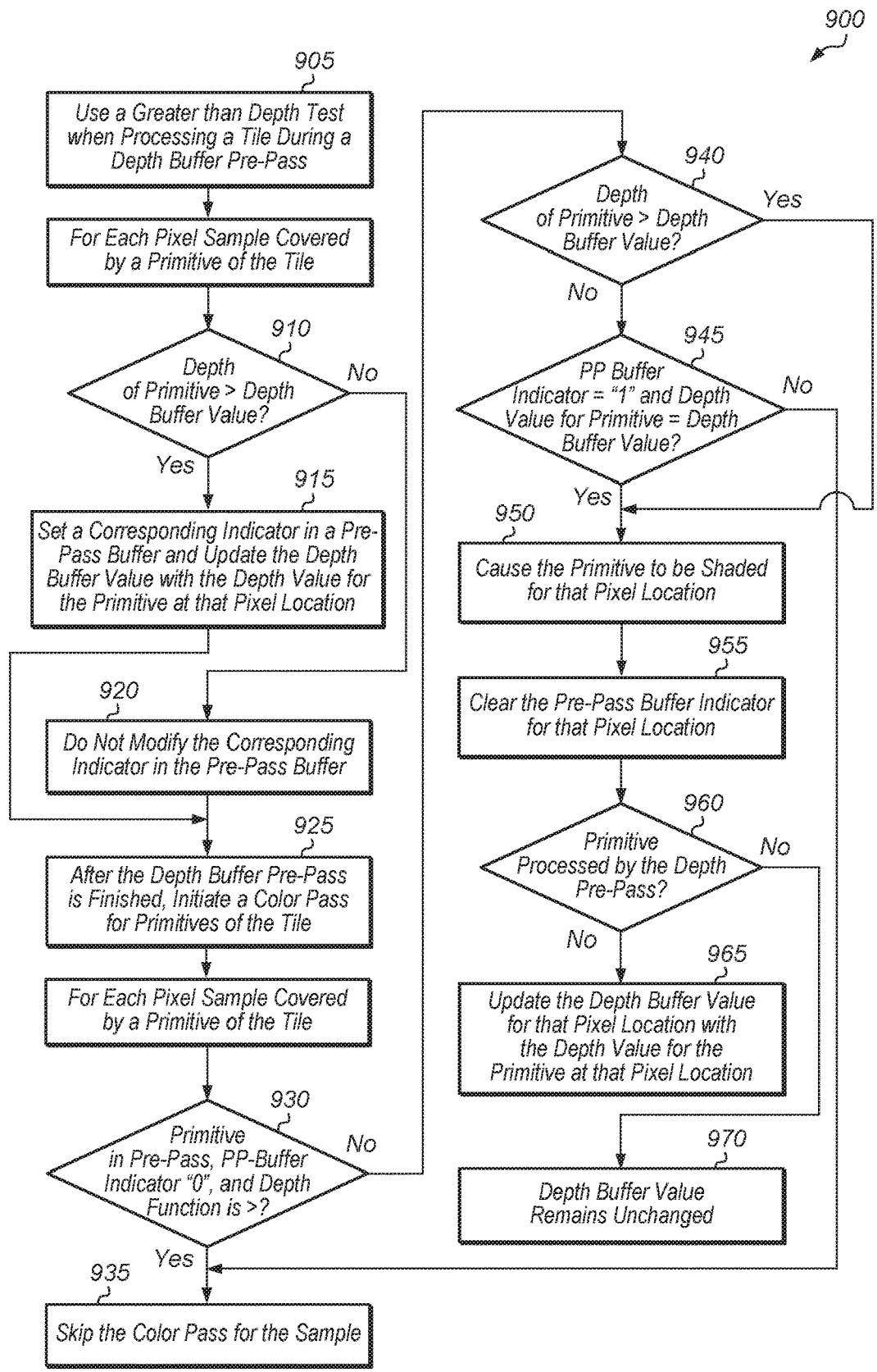
FIG. 9 is a generalized flow diagram illustrating one implementation of a method for changing a depth test function between passes.

Referring now to FIG. 9, one implementation of a method for changing a depth test function between passes is shown. A control unit uses a GREATER THAN depth test when processing a tile during a depth buffer pre-pass (block 905). For each pixel sample covered by a primitive of the tile, if the depth of the primitive at the pixel sample location is greater than a depth buffer value for that pixel location (conditional block 910, "yes" leg), then the control unit sets a corresponding indicator in a pre-pass buffer and updates the depth buffer value with the depth value for the primitive at that pixel location (block 915). If the depth of the primitive at the pixel sample location is less than or equal to a depth buffer value for that pixel location (conditional block 910, "no" leg), then the control unit does not modify the corresponding indicator in the pre-pass buffer (block 920). Then, after the depth buffer pre-pass is finished, the control unit initiates a color pass for primitives of the tile (block 925).

For each pixel sample covered by a primitive, the control unit determines if the primitive went through the depth pre-pass, if the pre-pass buffer indicator for the sample is cleared, and if the depth function for the primitive is GREATER THAN (conditional block 930). If the primitive went through the depth pre-pass, if the pre-pass buffer indicator for the sample is cleared, and if the depth function for the primitive is GREATER THAN (conditional block 930, "yes" leg), then the control unit skips the color pass for the sample (block 935). Otherwise, if either the primitive was not processed by the depth pre-pass, if the pre-pass buffer indicator for the sample is set, or if the depth function for the primitive is GREATER THAN OR EQUAL TO (conditional block 930, "no" leg), then the control unit determines if the depth of the primitive at the pixel location is greater than a depth buffer value for that pixel location (conditional block 940).

If the depth of the primitive at the pixel location is greater than the depth buffer value for that pixel location (conditional block 940, "yes" leg), then the control unit causes the primitive to be shaded for that pixel location (block 950). Also, the pre-pass buffer indicator for that pixel location is cleared (block 955). If the primitive was not processed by the depth pre-pass (conditional block 960, "no" leg), then the depth buffer value for that pixel location is updated with the depth value for the primitive at that pixel location (block 965). Otherwise, if the primitive was processed by the depth pre-pass (conditional block 960, "yes" leg), then the depth buffer value remains unchanged (block 970).

If the depth of the primitive at the pixel location is less than or equal to the depth buffer value for that pixel location (conditional block 940, "no" leg), then the control unit determines if the pre-pass buffer indicator for that pixel location is set and if the depth value for the primitive at that pixel location is equal to the depth buffer value for that pixel location (conditional block 945). If the pre-pass buffer indicator for that pixel location is set and if the depth value for the primitive at that pixel location is equal to the depth buffer value for that pixel location (conditional block 945, "yes" leg), then the control unit causes the primitive to be shaded for that pixel location (block 950). Otherwise, if either the pre-pass buffer indicator for that pixel location is cleared or if the depth value for the primitive at that pixel location is less than the depth buffer value for that pixel location (conditional block 945, "no" leg), then the control unit skips the color pass for the sample (block 935).

Figure 10:
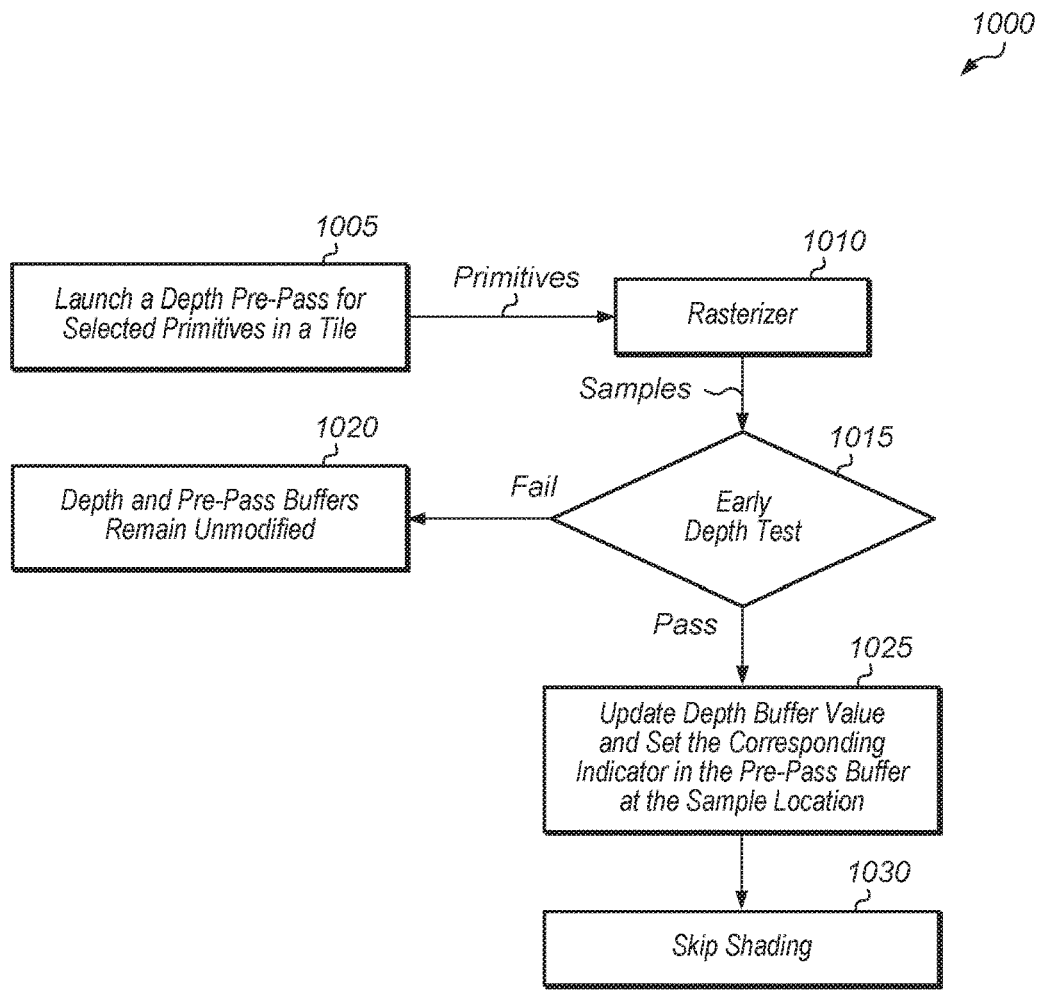
FIG. 10 is a generalized flow diagram illustrating one implementation of a method for performing a depth pre-pass.

Turning now to FIG. 10, one implementation of a method 1000 for performing a depth pre-pass is shown. A depth pre-pass is launched for selected primitives in a tile (block 1005). Then, the primitives are provided to a rasterizer for determining which screen pixels are covered by each primitive and outputting fragments for each covered pixel sample (block 1010). Next, an early depth test is performed for each fragment generated by the rasterizer for the selected primitives (conditional block 1015). The early depth test is performed for each fragment to determine if the fragment is visible. If a fragment of a primitive fails the early depth test (conditional block 1015, "fail" leg), then depth and pre-pass buffers remain unmodified (block 1020). It is noted that a sample is the element at depth buffer resolution. In other words, the resolution of the depth buffer is at the level of a sample. It is also noted that the terms "sample" and "fragment" can be used interchangeably herein.

Otherwise, if the fragment of the primitive passes the early depth test (conditional block 1015, "pass" leg), then the depth buffer value for the corresponding pixel sample is updated and the corresponding indicator in the pre-pass buffer at the sample location is updated (block 1025). Also, shading is skipped for the fragment (block 1030). It is noted that each of the pre-pass buffer indicators has a corresponding depth buffer value. After block 1030, method 1000 ends.

Figure 11:
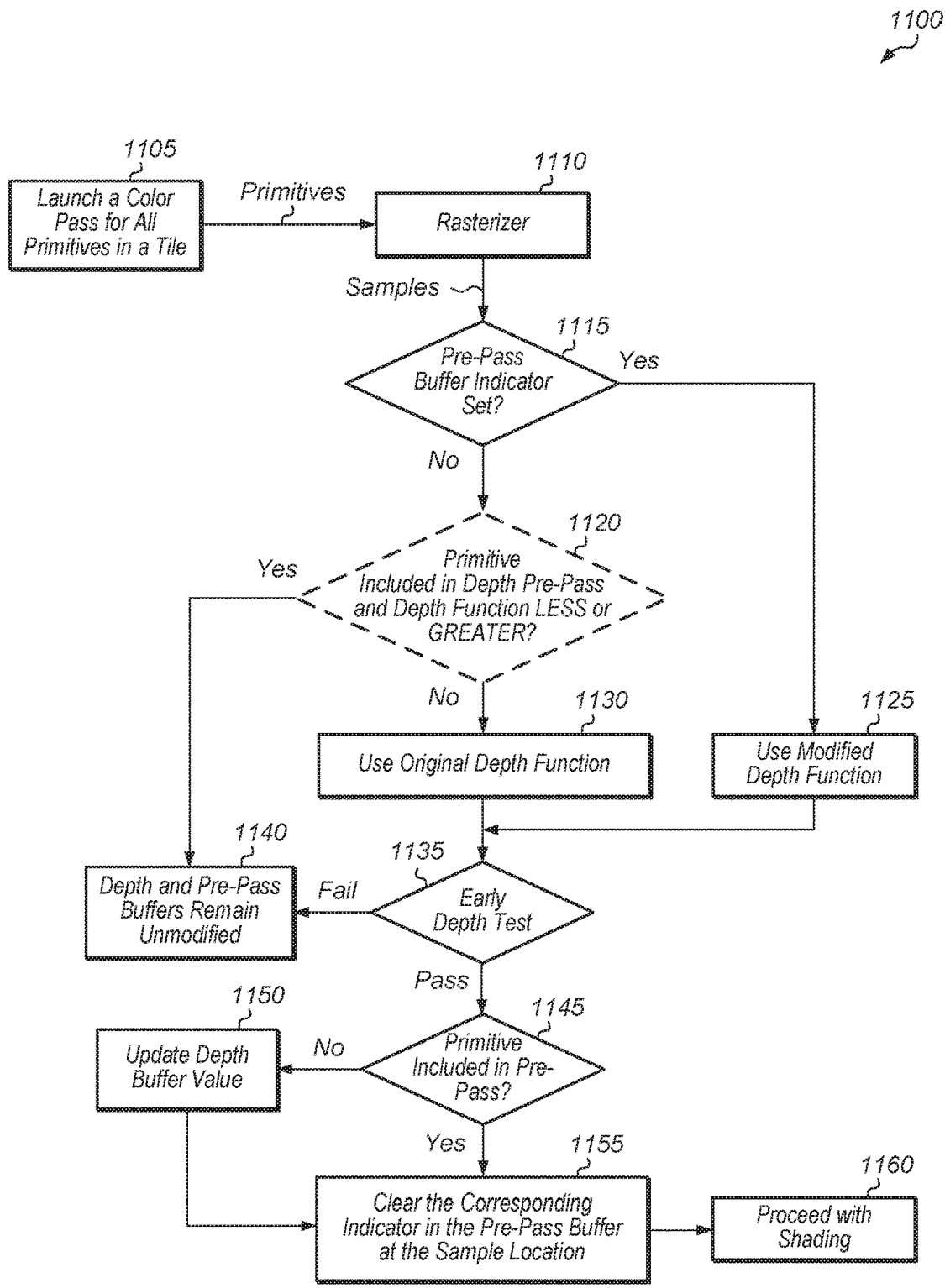
FIG. 11 is a generalized flow diagram illustrating one implementation of a method for performing a color pass.

Referring now to FIG. 11, one implementation of a method 1100 for performing a color pass is shown. A color pass is launched for all primitives in a tile (block 1105). Then, the primitives are provided to a rasterizer for determining which screen pixels are covered by each primitive and outputting fragments for each covered pixel sample (block 1110). Next, the pre-pass buffer indicator is read for each sample covered by each primitive fragment (conditional block 1115). If the pre-pass buffer indicator is set for a given pixel sample (conditional block 1115, "yes" leg), then a modified depth function is used (block 1125). For example, if the original depth function was LESS THAN, then the modified depth function becomes LESS THAN OR EQUAL TO. Alternatively, if the original depth function was GREATER THAN, then the modified depth function becomes GREATER THAN OR EQUAL TO.

If the pre-pass buffer indicator is not set (conditional block 1115, "no" leg), then the control unit optionally determines if the primitive was included in the depth pre-pass and if the depth function is LESS THAN or GREATER THAN (conditional block 1120). If the primitive was included in the depth pre-pass and if the depth function is LESS THAN or GREATER THAN (conditional block 1120, "yes" leg), then the depth and pre-pass buffers remain unmodified (block 1140). After block 1140, method 1100 ends for the given sample. If either the primitive was not included in the depth pre-pass or the depth function is LESS THAN OR EQUAL TO or GREATER THAN OR EQUAL TO (conditional block 1120, "no" leg), then the original depth function is used (block 1130). It is noted that conditional block 1120 is optional and does not have to be performed. If conditional block 1120 is not implemented, then method 1100 goes directly from the conditional block 1115 "no" leg to block 1130. After block 1130, an early depth test is performed (conditional block 1135).

If the fragment fails the early depth test (conditional block 1135, "fail" leg), then the depth and pre-pass buffers remain unmodified (block 1140). Otherwise, if the fragment passes the early depth test (conditional block 1135, "pass" leg), then the control unit determines if the primitive was included in the depth pre-pass (conditional block 1145). If the primitive was included in the depth pre-pass (conditional block 1145, "yes" leg), then this means that the depth values are known to be equal, and the control unit clears the corresponding indicator in the pre-pass buffer at the sample location (block 1155). Next, the control unit proceeds with shading for the fragment (block 1160). After block 1160, method 1100 ends for the fragment. If the primitive was not included in the pre-pass (conditional block 1145, "no" leg), then the depth buffer value is updated (block 1150), and the control unit clears the corresponding indicator in the pre-pass buffer at the sample location (block 1155). In another implementation, conditional block 1145 is forced to "no", and method 1100 will proceed from the conditional block 1135 "pass" leg directly to block 1150 in this case. After block 1155, the control unit proceeds with shading for the fragment (block 1160).

Figure 12:
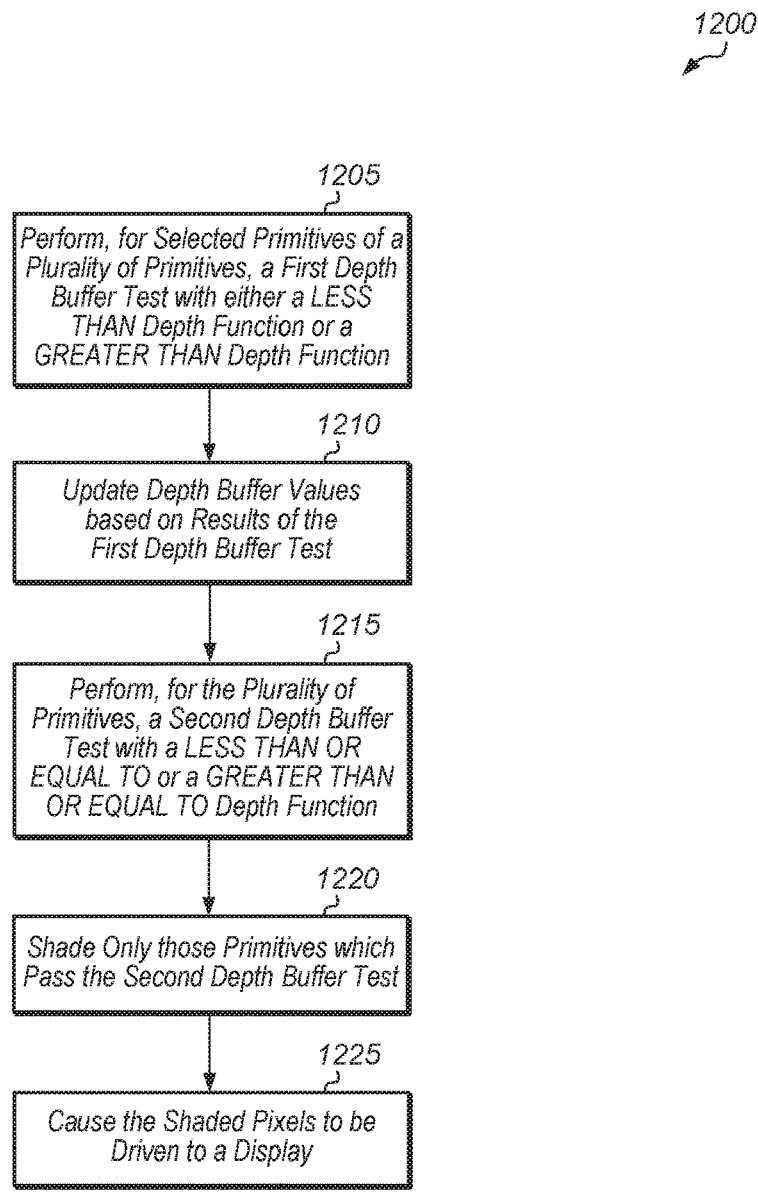
FIG. 12 is a generalized flow diagram illustrating one implementation of a method for modifying a depth function used by a color pass depth test.

Turning now to FIG. 12, one implementation of a method 1200 for modifying a depth function used by a color pass depth test is shown. A control unit performs, for selected primitives of a plurality of primitives, a first depth buffer test with either a LESS THAN depth function or a GREATER THAN depth function (block 1205). In one implementation, the plurality of primitives are stored in a cache, and the plurality of primitives correspond to a given tile of the screen. Next, the control unit updates depth buffer values based on results of the first depth buffer test (block 1210). Then, the control unit performs, for the plurality of primitives, a second depth buffer test with either a LESS THAN OR EQUAL TO depth function or a GREATER THAN OR EQUAL TO depth function (block 1215). For example, if the first depth buffer test used a LESS THAN function, then the second depth test uses a LESS THAN OR EQUAL TO depth function. Alternatively, if the first depth buffer test used a GREATER THAN function, then the second depth test uses a GREATER THAN OR EQUAL TO depth function.

Next, a pixel shader shades only those primitives which pass the second depth buffer test (block 1220). Then, the control unit causes the shaded pixels to be driven to a display (block 1225). After block 1225, method 1200 ends. When implementing method 1200, since a pre-pass buffer is not used, if there are multiple samples with an equal depth value, all of the Z-equal samples would be shaded and the last sample will be displayed. In contrast, when a pre-pass buffer is used and pre-pass indicators are stored for the samples processed by the pre-pass, only the first Z-equal sample is shaded, as is the case for a single-pass system.

Figure 13:
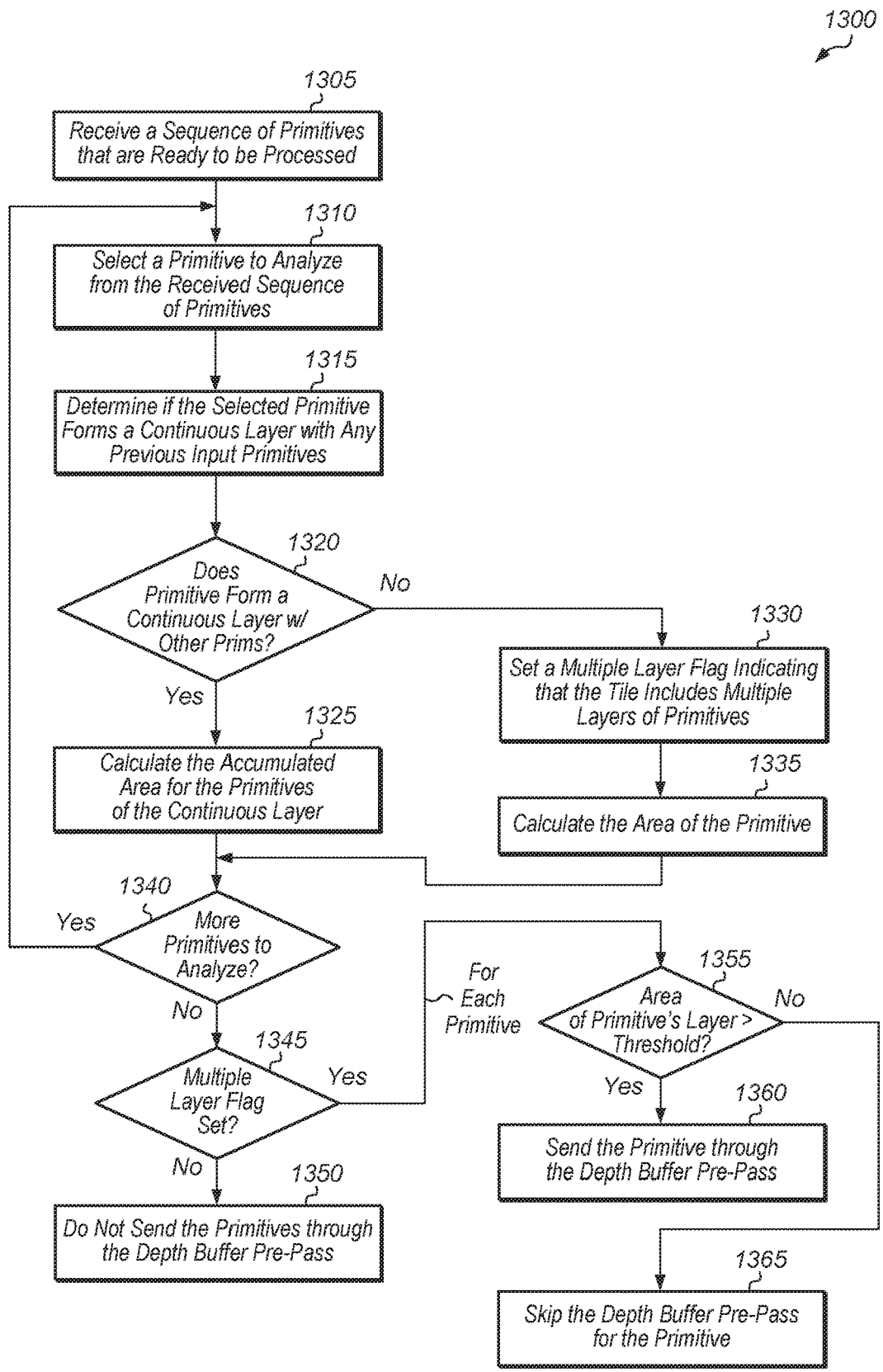
FIG. 13 is a generalized flow diagram illustrating one implementation of a method for selecting primitives for processing by a depth pre-pass.

Referring now to FIG. 13, one implementation of a method 1300 for selecting primitives for processing by a depth pre-pass is shown. A control unit receives a sequence of primitives that are ready to be processed (block 1305). In one implementation, the control unit only receives a subset of the complete set of primitives that were produced by a geometry processing step. In this implementation, the primitives are pre-filtered by removing some primitives based on primitive face direction. For example, back-facing primitives are removed in one scenario. Also, in one implementation, primitives are pre-filtered based on the view frustum such that only those primitives inside the view frustum are received by the control unit. In one implementation, those primitives intersecting the view frustum boundary are clipped to the frustum. Also, in one implementation, the input sequence of primitives is pre-filtered based on screen position of the primitive. For example, when the processing is performed simultaneously for multiple tiles in parallel, the tiles can be distributed over multiple processing units.

Next, the control unit selects a primitive to analyze from the received sequence of primitives (block 1310). Then, the control unit determines if the selected primitive forms a continuous layer with any previous input primitives (block 1315). In one implementation, the control unit determines if the primitive forms a continuous layer with previous primitives by checking if the primitives have shared vertices. It is noted that in one implementation, the vertex check does not need to use full vertex coordinates, but each vertex can be reduced to a hash with a lower number of bits to check and store. If the selected primitive forms a continuous layer with previous primitives (conditional block 1320, "yes" leg), then the control unit calculates the accumulated area for the primitives of the continuous layer (block 1325). In one implementation, the control unit maintains a separate accumulated area sum for each separate layer of primitives. For the first primitive that is selected, the default is for the "yes" leg to be selected in conditional block 1320, and then the control unit will calculate the area for the single primitive. If the selected primitive does not form a continuous layer with previous primitives (conditional block 1320, "no" leg), then the control unit sets a multiple layer flag indicating that the tile includes multiple layers of primitives (block 1330). If the multiple layer flag was previously set, then block 1330 can be skipped. Alternatively, in another implementation, the control unit maintains a counter to track the total number of separate layers. After (or concurrent with) block 1330, the control unit calculates the area of the primitive (block 1335).

After blocks 1325 and 1335, if there are more primitives of the tile that have yet to be analyzed (conditional block 1340, "yes" leg), then method 1300 returns to block 1310. Otherwise, if all primitives of the tile that have been analyzed (conditional block 1340, "no" leg), then if the multiple layer flag is not set (conditional block 1345, "no" leg), then the control unit does not send the primitives of the tile through the depth buffer pre-pass (block 1350). After block 1350, method 1300 ends. In another implementation, if the control unit maintains a counter tracking the total number of layers, the counter can be compared to a threshold in conditional block 1345. If the multiple layer flag is set (conditional block 1345, "yes" leg), then for each primitive, if the corresponding accumulated area of the primitive's layer is greater than a threshold (conditional block 1355, "yes" leg), then the control unit sends the primitive through the depth buffer pre-pass (block 1360). Otherwise, if the corresponding accumulated area of the primitive's layer is less than or equal to the threshold (conditional block 1355, "no" leg), then the control unit skips the depth buffer pre-pass for the primitive (block 1365). After blocks 1360 and 1365, method 1300 ends. In one implementation, after the depth buffer pre-pass is performed for the primitives selected in method 1300, all of the primitives of the tile are processed in the color pass.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a control unit, comprising circuitry, configured to be coupled to a cache storing a plurality of primitives that correspond to a tile of a scene, wherein the control unit is configured to
   perform a depth buffer pre-pass operation for the tile, responsive to the plurality of primitives of the tile not forming a single layer within the tile, wherein to perform the depth buffer pre-pass operation for the tile the control unit is configured to:
      perform, for selected primitives of the plurality of primitives, a first portion of processing associated with rendering the scene, wherein the first portion of processing comprises a first test;
      perform, for the plurality of primitives, a second portion of processing based on results of the first test, wherein the second portion of processing is associated with rendering the scene;
      generate shaded pixels for the scene as a result of the second portion of processing; and
      cause the shaded pixels to be driven to a display;
   skip the depth buffer pre-pass operation for the tile, responsive to the plurality of primitives forming a single layer within the tile.

2. The apparatus as recited in claim 1, wherein the first test is a depth buffer pre-pass test, and wherein the control unit is further configured to:
   identify a first subset of pixel samples which pass the depth buffer pre-pass test; and
   identify a second subset of pixel samples which fail the depth buffer pre-pass test.

3. The apparatus as recited in claim 2, wherein the second portion of processing comprises color shading, and the control unit is further configured to:
   perform, only for the first subset of pixel samples, color shading to generate shaded pixels corresponding to the first subset of pixel samples; and
   skip color shading for the second subset of pixel samples.

4. An apparatus as recited in claim 3, wherein the control unit is further configured to:
   perform, for a given pixel sample, the depth buffer pre-pass test with a first depth function; and
   perform, for the given pixel sample, a second depth buffer test with a second depth function, wherein the second depth function is different from the first depth function.

5. The apparatus as recited in claim 4, wherein the control unit is further configured to:
   set a corresponding indicator to a first value in a pre-pass buffer for the given pixel sample responsive to the given pixel sample passing the depth buffer pre-pass test;
   perform the second depth buffer test with the second depth function for the given pixel sample responsive to the corresponding indicator having the first value; and
   shade the given pixel sample and set the corresponding indicator to a second value in the pre-pass buffer responsive to the given pixel sample passing the second depth buffer test.

6. The apparatus as recited in claim 1, wherein the control unit is configured to determine whether the depth buffer pre-pass operation is performed based at least in part on a comparison of a calculated area of one or more of the plurality of primitives to a threshold.

7. The apparatus as recited in claim 1, wherein the control unit is configured to determine the plurality of primitives form a single layer within the tile based at least in part on a determination as to whether the plurality of primitives share one or more vertices.

8. A method comprising:
receiving a plurality of primitives that correspond to a tile of a scene;
performing a depth buffer pre-pass operation for the tile, responsive to the plurality of primitives of the tile not forming a single layer within the tile, wherein performing the depth buffer pre-pass operation for the tile comprises:
performing, for selected primitives of the plurality of primitives, a first portion of processing associated with rendering the scene, wherein the first portion of processing comprises a first test;
performing, for the plurality of primitives, a second portion of processing based on results of the first test, wherein the second portion of processing is associated with rendering the scene;
generating shaded pixels for the scene as a result of the second portion of processing; and
causing the shaded pixels to be driven to a display;
skipping the depth buffer pre-pass operation for the tile, responsive to the plurality of primitives forming a single layer within the tile.

9. The method as recited in claim 8, wherein the first test is a depth buffer pre-pass test, the method further comprising:
identifying a first subset of pixel samples which pass the depth buffer pre-pass test; and
identifying a second subset of pixel samples which fail the depth buffer pre-pass test.

10. The method as recited in claim 9, wherein the second portion of processing comprises color shading, and wherein the method further comprising:
performing, only for the first subset of pixel samples, color shading to generate shaded pixels corresponding to the first subset of pixel samples; and
skipping color shading for the second subset of pixel samples.

11. The method as recited in claim 10, further comprising:
performing, for a given pixel sample, the depth buffer pre-pass test with a first depth function; and
performing, for the given pixel sample, a second depth buffer test with a second depth function, wherein the second depth function is different from the first depth function.

12. The method as recited in claim 11, further comprising:
setting a corresponding indicator to a first value in a pre-pass buffer for the given pixel sample responsive to the given pixel sample passing the depth buffer pre-pass test;
performing the second depth buffer test with the second depth function for the given pixel sample responsive to the corresponding indicator having the first value; and
shading the given pixel sample and setting the corresponding indicator to a second value in the pre-pass buffer responsive to the given pixel sample passing the second depth buffer test.

13. The method as recited in claim 11, further comprising determining the plurality of primitives of the tile form a single layer within the tile, wherein said determining comprises determining whether the plurality of primitives share one or more vertices.

14. The method as recited in claim 8, further comprising determining whether the depth buffer pre-pass operation is performed based at least in part on a comparison of a calculated area of one or more of the plurality of primitives to a threshold.

15. A system comprising:
a processor configured to be coupled to a memory storing a plurality of primitives of a scene, wherein the processor is configured to
perform a depth buffer pre-pass operation for a tile, based on a determination that the plurality of primitives of a tile do not form a single layer within the tile, wherein to perform the depth buffer pre-pass operation for the tile the processor is configured to:
perform, for selected primitives of the plurality of primitives, a first portion of processing associated with rendering the scene, wherein the first portion of processing comprises a first test;
perform, for the plurality of primitives, a second portion of processing based on results of the first test, wherein the second portion of processing is associated with rendering the scene;
generate shaded pixels for the scene as a result of the second portion of processing; and
cause the shaded pixels to be driven to a display;
determine whether the depth buffer pre-pass operation is performed based at least in part on a comparison of a calculated area of one or more of the plurality of primitives to a threshold.

16. The system as recited in claim 15, wherein the first test is a depth buffer pre-pass test, and wherein the processor is further configured to:
identify a first subset of pixel samples which pass the depth buffer pre-pass test; and
identify a second subset of pixel samples which fail the depth buffer pre-pass test.

17. The system as recited in claim 16, wherein the second portion of processing comprises color shading, and wherein the processor is further configured to:
perform, only for the first subset of pixel samples, color shading to generate shaded pixels corresponding to the first subset of pixel samples; and
skip color shading for the second subset of pixel samples.

18. The system as recited in claim 17, wherein the processor is further configured to:
perform, for a given pixel sample, the depth buffer pre-pass test with a first depth function; and
perform, for the given pixel sample, a second depth buffer test with a second depth function, wherein the second depth function is different from the first depth function.

19. The system as recited in claim 15, wherein the processor is configured to skip the depth buffer pre-pass operation for the tile, based on a determination that the plurality of primitives form a single layer within the tile.

* * * * *